United States Patent [19]

Zeise

[11] Patent Number: 4,606,785

[45] Date of Patent: Aug. 19, 1986

[54] SIMPLIFIED METHOD OF MAKING HIGH STRENGTH RESIN BONDED MICA TAPE

[75] Inventor: Clarence L. Zeise, Penn Township, Westmoreland County, Pa.

[73] Assignee: Westinghouse Electric Corp., Pittsburgh, Pa.

[21] Appl. No.: 671,830

[22] Filed: Nov. 15, 1984

[51] Int. Cl.⁴ .................. B32B 31/12; B32B 19/06; B32B 19/02; C08L 67/02

[52] U.S. Cl. .................... 156/305; 156/330; 156/182; 156/192; 428/240; 428/304.4; 428/324; 428/413; 428/415; 428/247; 525/438

[58] Field of Search ............... 156/305, 330, 182, 192; 428/304, 324

[56] References Cited

U.S. PATENT DOCUMENTS

| | | | |
|---|---|---|---|
| 2,980,566 | 4/1961 | Wohlfahrt | 156/305 |
| 3,026,222 | 3/1962 | Rogers | 523/205 |
| 3,778,536 | 12/1973 | Smearing | 156/305 |
| 3,998,983 | 12/1976 | Smith | 428/324 |
| 4,020,017 | 4/1977 | Smith et al. | |
| 4,091,139 | 5/1978 | Quirk | 428/324 |
| 4,204,181 | 5/1980 | Smith et al. | |
| 4,296,018 | 10/1981 | Smith | 523/456 |
| 4,491,618 | 1/1985 | Kuwajima | 428/324 |

FOREIGN PATENT DOCUMENTS 49-104200 10/1974 Japan .................. 524/507

Primary Examiner—C. Warren Ivy
Attorney, Agent, or Firm—Daniel P. Cillo

[57] ABSTRACT

A resin solution is made from (1) an adhesive resin, such as a polyester resin containing an adhesive component, (2) a mica bonding resin such as an epoxy resin containing both cycloaliphatic epoxy and novolac epoxy, and (3) latent curing agent for the mica bonding resin; where the resin solution is used to coat a mica-backing composite, to provide, when dried at a time and temperature only to remove solvent, a mica bond mica tape useful for wrapping electrical coils without splitting or loss of mica.

7 Claims, 3 Drawing Figures

SIMPLIFIED METHOD OF MAKING HIGH STRENGTH RESIN BONDED MICA TAPE

BACKGROUND OF THE INVENTION

Impregnated, resin bonded mica tape is well known as a high performance insulating tape, particularly useful as ground insulation for high voltage motor or generator coils, as taught by Smith et al., in U.S. Pats. No. 4,020,017 and 4,204,181. The conventional method used to manufacture resin bonded mica tape involves two separate operations and two separate polymeric or resinous solutions. The mica sheet stock used, typically 600 yards in length and 40 inches wide, consists of small mica flakes held together only by molecular attraction and possibly some hydrogen bonding. This material is very weak and must be treated with a mica bond resin. In practice, an epoxy or polyester resin is applied in a solvent solution to the mica flake sheet as the mica bond resin. After the solvent is removed in a conveyor oven, the resin bonds the mica flakes together. At this stage the mica bond resin is dried but not cured. As a result of this procedure the mica sheet can then be further processed.

Althoguh some strength has been added to the mica by this resin treatment, it is far from what is required if it is to be applied to coils by high-speed machine taping heads. To provide the required level of tensile strength and support, and treated mica sheet must be bonded to a glass fabric or other suitable flexible backing material.

In current practice, the mica sheet now containing about 10 weight percent mica bond resin is directed to a second process station in which an adhesive in a solvent solution is applied either to the mica or to the glass fabric. The solvent is removed through a conveyor oven and the tacky adhesive surface is directed to come in contact with the surface to be bonded.

This is a delicate process when the adhesive is applied to the mica, since any solvent in the adhesive system tends to soften the uncured mica bond resin in the mica sheet. If the adhesive is applied to the glass fabric another problem must be addressed. The best glass for the end use of coil insulation is an open weave fabric having large interstices. Such a fabric has ample strength, low cost, and provides easy penetration in the subsequent resin impregnation operation which is applied in the final coil processing. Unfortunately the applied adhesive can strike through this open weave glass, causing a plating-out of the adhesive onto the processing rolls, with the result that clean-up must be performed at regular intervals. For these reasons the glass reinforced mica tape currently available is quite expensive.

In all cases, the resin bonded mica tape must be porous, so that subsequent vacuum pressure impregnation of insulating resin is possible. The resin bonded mica tape will usually contain from about 2 wt. % to about 15 wt. % resin solids, based on the total of mica, flexible backing, and resin weight. What is needed is a simplified, low cost process to make resin bonded mica tape, which will not block upon rolling for storage, and which can be easily impregnated with insulating resin after being wound on an electrical coil.

SUMMARY OF THE INVENTION

The above needs have been met and the above problems solved by utilizing a single, multicomponent resin solution to both bond the mica flakes together and act as an adhesive between the mica flakes and the support backing material. The resin solution used in this invention preferably contains: (A) linear polyester resin component blend containing (1) 1 part linear, saturated, cohesive polyester having a ball and ring softening point at from about 125° C. to about 180° C., preferably, a tensile strength greater than about 6,000 psi., and preferably, an elongation of up to 20%, and (2) from about 2 to about 5 parts linear, saturated, adhesive polyester having a ball and ring softening point at from about 70° C. to about 115° C., preferably a tensile strength of up to about 150 psi., and preferably an elongation greater than about 800%; (B) an epoxy resin component containing (1) epoxy novolac resin; and (2) cycloaliphatic epoxy resin; (C) latent catalyst for the epoxy resin component; and (D) suitable solvent for the resins.

In the method of this invention, in its broadest scope, a composite of a resin permeable mica sheet and a resin permeable backing material are provided, where the backing material has a higher resin permeability than the mica sheet, where a solution of (1) mica bonding resin capable of permeating both the mica sheet and the backing and (2) an adhesive resin capable of permeating the backing but not the mica sheet is brought to contact the backing material, and where resin solvent is removed, thereby binding the mica in the mica sheet together and adhering the backing material to the mica sheet. More specifically, in this invention, a mica sheet layer, where the mica is generally felted as paper or is in the form of small flakes, is contacted with flexible backing material layer, preferably glass fabric, and then the resin admixture described before is applied. During resin contact, the epoxy resin component permeates the mica sheet, but the polyester resin component is unable to appreciably permeate into the mica, and a combination of the epoxy and polyester resins encapsulate the fibers of the fabric. Upon heating, the polyester bonds to the epoxy in the mica at the mica-backing interface. The resin containing composite is generally heated by being quickly passed through an oven at from about 60° C. to about 100° C., to eliminate solvent and dry but not cure the resin admixture. The bonded, consolidated mica tape is then wound on a reel for sotrage. By "permeate" as used herein is meant the ability to pass through, even though in the backing material the porosity is very high and the resins may actually encapsulate backing fibers but not necessarily penetrate the individual fiber bundles.

If the resin solution did not contain polyester resin, the backing would not adhere to the mica sheet and upon bending would separate. If the resin solution did not contain epoxy resin, the mica in the mica layer would flake off causing disintegration of the mica layer upon bending, flexing or coil wrapping. The use of a bisphenol "A" epoxy resin as a substitute for the novolac epoxy resin or cycloaliphatic epoxy resin used in the admixture would provide a very tacky bonded mica tape, that could easily block on the storage reel, and couldn't be unwound for use.

The final bonded mica tape made according to this invention allows storage winding without interleafs, has excellent storage stability of about 6 months or more at 25° C., good flexibility while remaining consolidated, high tensile strength allowing machine winding of coils, good dielectric strength, excellent voltage endurance, and because of no more than about 10 wt. % to 15 wt. % resin content, good penetration by the final coil impregnating resin as typically used in vacuum pressure processing of motor coils.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
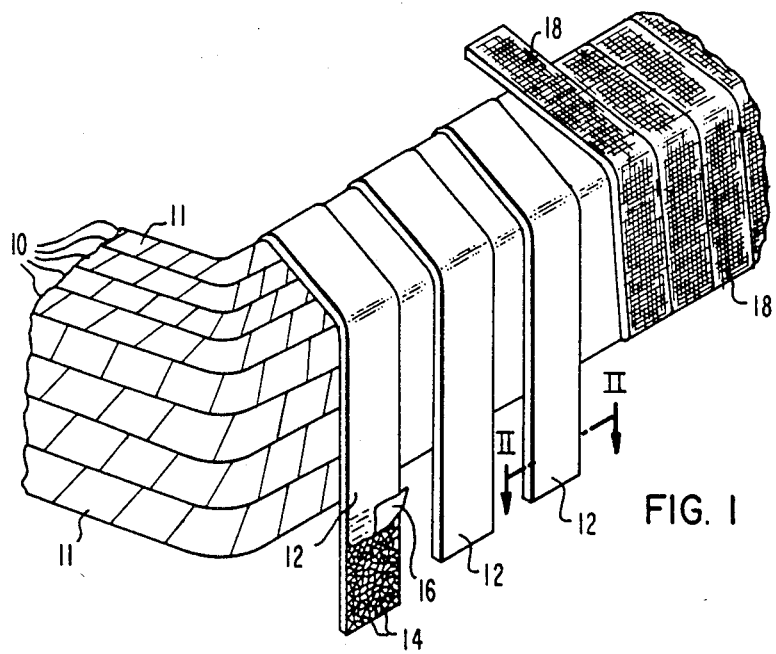
FIG. 1 is a fragmentary view in perspective, showing part of a high voltage coil using mica tape as ground insulation, covered with a porous bonding tape.

The bonding resin solution used in this invention is an admixture consisting essentially of: (A) a linear polyester resin component blend which primarily acts as an adhesive between the mica sheet resin and backing, consisting essentially of (1) linear, saturated polyester exhibiting strong cohesive properties, i.e., holds itself firmly together—high softening and tensile strength properties, and having a preferred molecular weight of from about 12,000 to about 37,000, most preferably 20,000 to 30,000, a ball and ring softening point at from about 125° C. to about 180° C., preferably, a tensile strength greater than about 6,000 psi., and preferably, an elongation of up to about 20%, and (2) linear, saturated polyester exhibiting adhesive properties—low softening and tensile strength properties, and having a preferred molecular weight of from about 12,000 to about 37,000, most preferably 20,000 to 30,000, a ball and ring softening point at from about 70° C. to about 115° C., and preferably, a tensile strength of up to about 150 psi., and preferably, an elongation greater than about 800%; (B) an epoxy resin component which primarily acts as a binder between the mica particles in the mica sheet, consisting essentially of (1) epoxy novolac preferably having an epoxy equivalent weight of from about 170 to about 220, and (2) cycloaliphatic epoxy preferably having an epoxy equivalent weight of from about 90 to about 160; (C) latent catalyst for the epoxy resin component, preferably an organo tin compound; and (D) suitable solvent for the resins, preferably a mixture of a polar solvent, such as methyl ethyl ketone, and an aromatic solvent, such as toluene.

Polyester resins are well known in the art, generally being condensation products of a glycol with a dicarboxylic acid; and their preparation is detailed, for example, in *Plastics Materials*, by J. A. Brydson, D. Van Nostrand Co., 1966, chapter 21, herein incorporated by reference. The useful polyesters for the resin solution of this invention have either adhesive or cohesive properties and are of intermediate molecular weight. The combination of the two polyesters has a high cohesion matched with good adhesiveness, with virtually no tack, and is of an elastomer variety. It is essential that one polyester have cohesive properties and the other polyester have strong adhesive properties, to provide, when combined in a suitable solvent, a polyester resin component that is compatible with the epoxy resin component, and which will provide an adhesive to the mica sheet, and non-tacky, non-blocking surface properties to the tape.

Both the linear, saturated polyester exhibiting cohesive properties and the linear, saturated polyester exhibiting adhesive properties are hydroxyl terminated and do not have any vinyl saturation in the polymer. Useful glycols for making both of these polyesters would include aliphatic dihydric glycols, such as, neopentyl glycol, ethylene glycol, propylene glycol, 1,3-propane diol, 1,4-britane diol, and 1,2-britane diol. Useful acids for making both of these polyesters would include aromatic dicarboxylic acids having no vinyl saturation, such as isophthalic acid or anhydride, phthalic acid or anhydride and terephthalic acid or anhydride, or aliphatic dicarboxylic acids, such as adipic acid, succinic acid, glutaric acid, and the like. Preferably there will be mixtures of both types of acids.

To make the polyester exhibit cohesive properties, the aromatic dicarboxylic acid should be maximized and the aliphatic dicarboxylic acid should be minimized, for example, a suitable admixture would include 70 mole % terephthalic acid and 30 mole % adipic acid, mixed with a slight mole excess of glycol containing 60 mole % ethylene glycol and 40 mole % 1,3-propane diol. To make the polyester exhibit adhesive properties, this aromatic dicarboxylic acid should be minimized and the aliphatic dicarboxylic acid should be maximized, for example, a suitable admixture would include 30 mole % terephthalic acid and 70 mole % adipic acid, mixed with a slight mole excess of glycol containing 40 mole % ethylene glycol and 40 mole % 1,3-propane diol. In all cases the adheisve and cohesive polyesters are reacted between about 130° C. and about 190° C., preferably with a $N_2$ blanket. The molecular weight of the reaction product would be dependant on how long the reaction was continued to eliminate water from the reaction. An effective amount of an esterification catalyst would also be used in the reaction, for example, phosphoric acid, para toluenesulfonic acid, and the like. The reaction is stopped at a relatively low acid number, a medium range hydroxyl number, and an appropriate molecular weight.

The useful solids weight ratio of cohesive polyester-:adhesive polyester is a very important parameter, and ranges from about 1:2 to 5, thus the polyester can be characterized as primarily an adhesive that is not unduly tacky. Under about 2 parts by weight adhesive polyester/1 part by weight cohesive polyester, poor bond of the mica sheet to the backing support results. Over aobut 5 parts by weight adhesive polyester/1 part by weight cohesive polyester, blocking of the mica tape will occur upon winding. The polyester must be tailored to provide somewhat opposite properties to be useful in this invention. "Tensile strength" and "ball and ring softening point" are terms well defined in the art and tests for both of those properties are given under ASTM D-638 or ASTM D-882. "Elongation" is another well-known term and tests for that property are given under ASTM E-28.

Epoxy resins are well known in the art. Complete descriptions of both epoxy novolacs and cycloaliphatic epoxies are found in U.S. Pat. No. 4,204,181, herein incorporated by reference. The polyglycidylethers of a phenol formaldehyde novolac (epoxy novolac) are prepared by reacting an epihalohydrin with phenol formaldehyde condensates. While the bisphenol "A"-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins. The product of the reaction is generally a massive oxidation resistant aromatic compound.

The cycloaliphatic type epoxies employed in the invention are selected from non-glycidyl ether epoxies containing more than one 1,2 epoxy group per molecule. These are generally prepared by epoxidizing unsaturated aromatic hydrocarbon compounds, such as cyclo-olefins, using hydrogen peroxide or peracids such as peracetic acid and perbenzoic acid. Such non-glycidyl ether cycloaliphatic epoxies are here characterized by the absence of the ether oxygen bond, i.e. —O—, near the epoxy group, and are selected from those which contain a ring structure as well as more than one epoxy group in the molecule. Examples of non-glycidyl ether cycloaliphatic epoxies would include 3,4-epoxycyclohexylmethyl-3,4-epoxycyclohexane carboxylate, vinyl cyclohexene dioxide, 3,4-epoxy-6-methylcyclohexylmethyl-3,4-epoxy-6-methylchclohexane carboxylate, and dicyclopentadiene.

It is essential that both epoxy novolacs and cycloaliphatic epoxies be used. The epoxy novolac provides good high temperature electrical properties. the cycloaliphatic epoxy resin has good penetration properties, lowers the viscosity of the epoxy resin mixture, increases the flexibility of the mica tape, and helps in the reaction with the latent catalyst. The useful solids weight ratio of cycloaliphatic epoxy:epoxy novolac is from about 1:1.5 to 20. Under about 1.5 parts by weight novolac epoxy/1 part by weight cycloaliphatic epoxy, the mica tape becomes too tacky and susceptible to blocking. Over about 20 parts by weight novolac epoxy/1 part by weight cycloaliphatic epoxy, the mica tape becomes too stiff. As mentioned before, bisphenol "A" type epoxy resins are not useful because they provide a very tacky bonded mica tape.

Almost any latent catalyst for epoxy resins can be used in this invention. The preferred latent catalysts, i.e., compounds which can dramatically speed up gel time or curing rates at catalytic initiation or "kick off" temperatures over about 120° C., even when used in small quantities, while exhibiting substantially little catalytic activity at temperatures generally up to about 100° C., are organo-tin compounds, such as organo-tin acetates, butyrates, propionates, hydroxides, dimethyl phosphates, and halides that are soluble in the resin solution used as the mica bond. U.S. Pat. No. 4,020,017, herein incorporated by reference, describes such compounds in detail.

Examples of such, organo-tin compounds include triphenyl-tin acetate, triphenyl-tin chloride, tri N-butyl-tin chloride, tribenzyl-tin chloride, trimethyl-tin chloride, triethyl-tin chloride, tripropyl-tin chloride, triphenyl-tin bromide, triphenyl-tin iodide, triphenyl-tin hydroxide, triphenyl-tin butyrate, triphenyl-tin propionate, triphenyl-tin dimethyl phosphate tribenzyl-tin bromide, tribenzyl-tin iodide, tribenzyl-tin acetate, tribenzyl-tin hydroxide, tribenzyl-tin butyrate, tribenzyl-tin propionate, tribenzyl-tin dimethyl phosphate, trinaphthyl-tin chloride, trichlorophenyl-tin chloride, tricyclopentene-tin chloride, dibenzylphenyl-tin chloride, diphenylbenzyl-tin chloride, diphenyl-n-butyl-tin chloride and the like, with triphenyl-tin acetate being the most preferred.

Useful solvents for the resins include polar (oxygenated) solvents, such as methyl ethyl ketone, methyl isobutyl ketone, mixtures thereof, and the like, and aromatic solvents, such as toluene, xylene, mixtures thereof, and the like, and mixtures of said polar and aromatic solvents. Preferred solids wt. % for the polyester resin component is from about 20 wt. % to about 45 wt. %. Preferred solids wt. % for the epoxy resin component is from about 30 wt. % to about 60 wt. %. Useful solids wt. % for the bonding resin admixture (polyester plus epoxies) in final solvent solution, ready for processing the mica tape is from about 2 wt. % to about 30 wt. %, where additional solvent is added to the polyester solution and epoxy solution admixture.

The useful solids weight ratio of epoxy resin component (dual epoxy mixture):polyester resin component (dual polyester mixture):latent catalyst for the epoxy resin, is from about 100:100 to 150:0.05 to 0.5. Under about 100 parts by weight polyester resin component/100 parts by weight epoxy component, the mica tape becomes tacky and can block and start to lose bond strength between the mica sheet and the backing support. Over about 150 parts by weight polyester resin component/100 parts by weight epoxy component, the resin combination starts to lose reactivity, so that there is little interaction with subsequently applied vacuum impregnated resin, leading to poor electrical and mechanical coil properties.

While not to be held to any particular theory, it is believed that the hydroxyl groups of the polyester resins interact with the epoxy resin. The admixture of all the resin solution components in the ranges set forth previously provides an outstanding uncured resin bonded mica tape rhelogy, i.e., good flexibility, low tack and low blocking properties, and low transfer of resin, providing a very "handleable" product having from about 2% to about 15% resin, preferably from 2% to 10%, based on the total of mica, flexible backing, and resin weight.

In a high voltage A.C. motor or generator, the coil member may comprise a plurality of turns of round or rectangular metallic, electrical conductors, each turn of the conductor consisting of a copper or aluminum strap 10 wrapped with turn insulation 11, as shown in FIG. 1 of the Drawings. The turn insulation 11 would be disposed between the conductor straps 10 and the mica tape 12, and would generally be prepared from a fibrous sheet or strip impregnated with a resinous insulation. The resin applied to the turn insulations may be a phenolic resin, an alkyd resin, a melamine resin or the like.

The turn insulation 11 is generally not adequate to withstand the severe voltage gradients that will be present between the conductor and ground when the coil is installed in a high voltage AC motor or generator. Therefore, ground insulation for the coil is provided by mica tape 12, which binds the entire coil of electrical conductors together. Preferably, a plurality of layers of composite mica tape 12, which may comprise mica flakes 14 bound to a flexible backing material 16, are wrapped about the coil to bind the electrical conductors together with 2 to 6 layers generally being used for high voltage coils. A final protective tape 18, which is porous may be wound around the mica tape bound coil. The protective tape may comprise a porous, open weave substrate of glass or natural or synthetic fabric or cloth.

Figure 2:
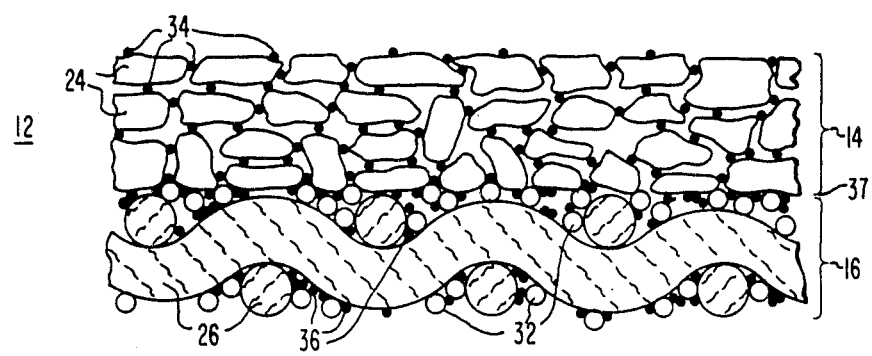
FIG. 2 is a magnified, simplified, cross-sectional view of the mica tape of FIG. 1 across section II—II.

A detailed, magnified, and greatly simplified cross-section of the mica tape 12 of FIG. 1, across section II—II is shown in FIG. 2 of the Drawings, before the tape is finally vacuum pressure impregnated with insulating resin. Although the mica used in the tape can be in the form of felted paper containing minute mica particles, mica flakes in the range of about 1/32 inch × 1/32 inch × 0.0001 inch thick are generally used, because they impart a higher dielectric strength per unit of thickness. These mica flakes are processed into a fragile, layered sheet form, held together only by molecular attraction and possibly some hydrogen bonding. To provide support, a suitable, flexible backing material 16, such as glass fabric, nylon fabric, polyethylene terephthalate (polyester) fabric, and the like, is combined with the mica sheet. Such backing material is generally from about 0.001 inch to about 0.002 inch thick. The sheet mica flake thickness is generally from about 0.002 inch to about 0.005 inch thick.

FIG. 2 shows the mica sheet-woven backing composite, bonded together and consolidated after transfer roll processing or other resin application of the resin previously described, and after being quickly dried in an oven at a low temperature to remove solvent. As stated previously, the epoxy resin component penetrates or permeates mica layer 14 and backing material layer 16, and is schematically shown as small bonding areas, 34 in between and among the mica flakes 24 and as small bonding areas, 36 in the backing layer 16. The epoxy 34 is effective to control disintegration or mica flaking from the outer mica layer during flexing of the tape.

The polyester resin component, thought to comprise larger molecules, does not easily or at all penetrate or permeate mica layer 14. The polyester resin component does penetrate or permeate the backing layer 16, and is shown as large bonding areas, 32. The polyester component contributes substantially to mica-backing interface adhesive bonding. The polyester component and the epoxy resin component interact with each other upon heating. Both resins substantially encapsulate the backing layer fibers 26, and the polyester bonds to the epoxy resin component in the mica, at the contact interface 37 between the mica layer and the backing layer. The backing layer as such is permeated by the resins and fibers are encapsulated, but the fibers—which are made up of many filaments—are not necessarily permeated, i.e., the resins cover fibers 26 but do not necessarily penetrate into the minute volumes between the individual strands making up each fiber or fiber bundle. However, the backing layer is still considered to be permeated by the resins. As is shown, only a small amount of resin is contained in the resin bonded mica tape. Additionally the fabric layer 16 is open weave, so that subsequent vacuum pressure impregnation is not difficult. The composite of mica and backing is characterized as having the ability to remain a consolidated composite upon substantial flexing, bending or winding, without any substantial loss of mica particles from the surface opposite the backing layer. Thus, coil winding, as shown in FIG. 1 can be accomplished without any substantial mica loss from the top portion of the mica sheet or mica sheet separation from the backing.

Figure 3:
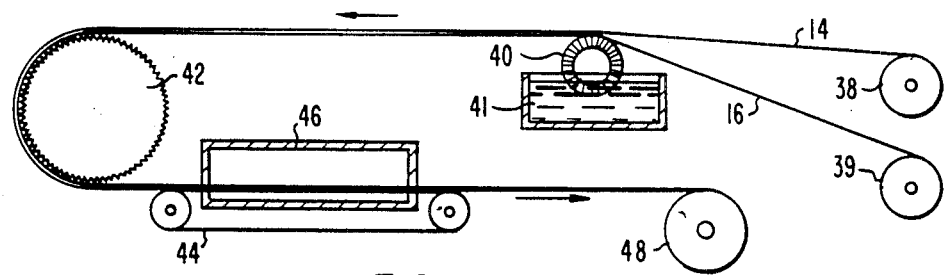
FIG. 3 is a simplified schematic illustration of one embodiment of a process for making resin bonded mica tape.

In the method of this invention, shown in one embodiment in FIG. 3, mica sheet material 14, such as mica paper or mica flakes is passed from reel 38 and contacted with flexible backing material 16 from reel 39. The contacting material layers are then passed over a resin transfer roll 40, which applies some pressure to the composite and where the low solids polyester-epoxy resin solution 41 is applied to the backing layer. The solution then transfers up through the backing and selectively into the mica layer.

The resin contacted composite is then turned 180° by means of large fluted roll 42, to prevent sticking. Thus, the mica is fed face down onto conveyor belt means 44, which then quickly passes the composite through a drying oven 46. Resin temperature at application is about 25° C. and dwell time from the transfer roll to the oven can range from about 5 seconds to about 20 seconds. Dwell time in the oven is generally from about 1 minute to 10 minutes, preferably from about 2 minutes to about 5 minutes. The oven is preferably operating at a temperature of from about 60° C. to about 100° C., a temperature below the catalytic initiation temperature of the latent catalyst, to eliminate most of the solvent without curing any resin and to provide a porous, resin bonded mica tape of good structural integrity, that is flexible and non-tacky, so that it can be wound on take-up reel 48 for storage without blocking. The wound tape is then unwound, slit into narrow tape widths and machine wound onto a motor coil, as shown in FIG. 1 of the Drawings; followed by vacuum impregnation with a suitable epoxy, polyester or the like final impregnating resin.

EXAMPLE 1

A mica tape processing solution was made. First, 590 grams of solid, PE200, linear, saturated polyester sheet stock pieces were added to 2,360 grams of methyl ethyl ketone at 25° C., with stirring, until all the polyester stock was dissolved. This polyester was of the type having cohesive properties and had a molecular weight of from about 20,000 to 30,000, a ball and ring softening point (ASTM E-28) of 163° C., a tensile strength (ASTM D-822) of greater than 7,000 psi. and an elongation (ASTM D-822) of less than 10% (sold commercially by Plastics Dept. of Goodyear Tire & Rubber Co. under the tradename Vitel PE200 sheet stock).

Then 2,097 grams of solid, VPE 5545, linear, saturated polyester sheet stock pieces were added to 2,933 grams of methyl ethyl ketone and 1,467 grams of toluene at 25° C., with stirring, until all the polyester stock was dissolved. This polyester was of the type having adhesive properties and had a molecular weight of from about 20,000 to 30,000, a ball and ring softening point (ASTM E-28) of 98° C., a tensile strength (ASTM D-822) of less than 100 psi. and an elongation (ASTM D-822) of greater than 1000% (sold commercially by Plastics Dept. of Goodyear Tire & Rubber Co. under the tradename Vitel VPE 5545 sheet stock). These two batches were then mixed together providing a polyester resin component of 28.4% solids, based on resin and solvent weight with a weight ratio of cohesive polyester solids:adhesive polyester solids of 590:2097 or 1:3.55.

Then, 90 parts by weight of a solid polyglycidyl ether of a phenol formaldehyde novolac (epoxy novolac) resin having an epoxy equivalent weight of from 191 to 210, and a Durran's melting point of 48° C. to 58° C. (sold commercially by Dow Chemical Co. under the tradename DEN 439) was mixed into 10 parts by weight of 3,4-epoxycyclohexylmethyl-3,4-epoxycyclohexane carboxylate (low viscosity liquid cycloaliphatic epoxy) resin having an epoxy equivalent weight of 133 and a viscosity at 25° C. of from 350 cps. to 450 cps. (sold commercially by Dow Chemical Co. under the tradename ERL-4221). To this epoxy mixture, 0.2 part by weight of triphenyl tin acetate latent catalyst was added. This provided a solids weight ratio of cycloaliphatic epoxy:epoxy novolac of 1:9. To 1,791 grams of this mixture, 597 parts of methyl ethyl ketone and 1,194 parts of toluene were added, providing an epxoy resin component of 50 wt. % solids based on resin and solvent weight.

Then, the epoxy resin component, containing 1,791 grams of solids, was slowly added and mixed into the polyester resin component, containing 2,687 grams of solids, to provide a mica bond resinous solution having a solids weight ratio of epoxy resin component (dual epoxy mixture):polyester resin component (dual polyester mixture):latent catalyst of 1791:2687:0.2 or 100:150:0.11. Solids content of the mica bond resin solution was 4478 grams total solids/13,029 grams total resin and solvent or 34.3% resin solids. Additional solvent was then added to provide a processing solution having about 15 wt. % solids based on resin and solvent weight.

Mica sheet, containing mica particles, having a tensile strength of 3.75 pounds and a total thickness of 0.003 inch was passed from a roll and contact mated on top of 0.002 inch thick, style 1299 glass fabric, having a tensile strength of 70 pounds, in a manner similar to that shown in FIG. 3 of the Drawings. A transfer roll mounted above a bath containing the mica bond solution coated the glass fabric with the solution, which solution selectively permeated the mica sheet, wetting the mica particles in the sheet. The mated mica-glass tape was then passed to a large diameter fluted roll which reversed the direction of the tape 180°, and led the mica layer onto a moving conveyor belt which transported the tape mica face down through a hot air drying oven, operating at a temperature of about 85° C. to 90° C. The travel time between the coating station and the drying oven was about 15 seconds. Dwell time in the drying oven was about 3 minutes. The bonded product was then wound without an interleaf into master rolls for storage and subsequent slitting into 1 inch wide tape widths.

Samples of the tape showed a 10 wt. % resin solids content based on mica, backing, resin weight. The tape was dry, extremely flexible, non-tacky, and did not block on the master roll after storage for over 6 months at 25° C. The tape had good structural integrity with the mica and glass bonding firmly together even after substantial test flexing and winding. The resin in the tape was not cured. Epoxy impregnating resin was subsequently brushed onto both surfaces of the tape and easily penetrated even under gravity flow. The tape thickness was from 0.005 to 0.006 inch, and it had a tensile strength of 70 pounds/inch width, a flexibility as made of 540 grams (Gurley Stiffness), and a flexibility after 33 days storage at 25° C. of 546 grams (Gurley Stiffness). This mica bond tape was considered a well made tape, extremely useful as a high strength mica product for use in winding motor coils, which provided extreme ease of subsequent impregnation by insulating resin.

COMPARATIVE EXAMPLE 1

In a test to evaluate the bonding and flexibility of the resin composition of EXAMPLE 1, three resin solutions were made: Sample 1 was the same mica bond resin solution as made in EXAMPLE 1 (containing dual polyester resin components PE 200 and VPE 5545; dual epoxy resin components DEN 439 novolac and ERL 4221 cycloaliphatic epoxies; and triphenyl tin acetate) using the same ranges and process parameters as in EXAMPLE 1; Sample 2 was the same as Sample 1, except that it contained no polyester resin and; Sample 3 was the same as Sample 1, except that it contained no epoxy resin.

All three resin Samples were brushed on top of a sheet of 0.002 inch thick glass fabric which covered a sheet of 0.003 inch thick mica flake paper. The composite sheet, which was 6 in.×6 in., was then dried in an oven at 80° C. for 3 minutes. Resin content was from about 7 to 9 wt. % resin solids. After cooling, the sample composite sheets were tested for bonding strength and flexibility. The Sample 1 composite, using the resin solution of this invention, was well bonded with good adhesion at the interface of the mica and glass fabric and was very flexible, showing good structural integrity after frequent bending. The Sample 2 composite (no polyester in the resin) had a well wetted out mica sheet under the glass fabric, however, the mica layer was not bonded to the glass fabric. The Sample 3 composite (no epoxy in the resin) bonded the glass to the mica after solvent was flashed off. In all instances the individual mica flakes of the mica sheet would easily separate however, when the Sample 3 combination was flexed back and forth, indicating no resin impregnation into the mica sheet. Thus, a useful single step mica bond resin formulation requires a dual polyester and epoxy composition. Similar results to EXAMPLE 1 would be achieved by utilizing the other epoxies, polyesters and latent catalysts hereinbefore described in the ranges set forth.

I claim:
1. A method of making a flexible, porous, resin bonded mica tape comprising the steps:
   (1) providing a composite of a resin permeable mica sheet and a resin permeable open weave fabric backing material wherein the backing material has a higher resin permeability than the mica sheet;
   (2) providing a solution of 100 parts by weight of an epoxy mica bonding resin consisting essentially of epoxy novolac and cycloaliphatic epoxy, which will permeate both the mica sheet and the backing material, and from about 100 parts by weight to about 150 parts by weight of a polyester adhesive resin consisting essentially of linear, saturated polyester exhibiting cohesive properties having a ball and ring softening point at from about 125° C. to about 180° C. and an elongation to about 20°%, and linear, saturated polyester exhibiting adhesive properties having a ball and ring softening point at from about 70° C. to about 115° C. and an elongation greater than about 800%, which will permeate the backing material but not the mica sheet;
   (3) contacting the backing material of the composite with said solution so that the mica bonding resin permeates the mica sheet and the adhesive resin permeates only the backing sheet; and
   (4) removing the resin solvent, thereby binding the mica in the mica sheet together and adhering the backing material to the mica sheet.
2. The method of claim 1 wherein the adhesive resin bonds to the epoxy resin in the mica sheet at the mica-backing contact interface providing a dried, flexible, porous, resin bonded, consolidated mica tape composite containing from about 2 wt. % to about 15 wt. % resin solids and the consolidated mica tape composite is characterized as remaining a consolidated composite upon bending, without disintegration of the mica sheet.
3. The method of claim 1, wherein the mica in the mica sheet is selected from the group consisting of felted paper, and flakes, the backing material is selected from the group consisting of glass fabric, cotton fabric, nylon fabric, and polyethylene terephthalate fabric and the mica tape composite is wound around an electrical coil.

4. A method of making a flexible, porous, resin bonded mica tape comprising the steps:

(1) contacting a mica sheet with a flexible open weave fabric backing material to form a composite;

(2) applying a bonding resin admixture solution of polyester resin and epoxy resin to the backing material, where the polyester and epoxy permeate the backing material and the epoxy permeates the mica sheet, where the resin admixture solution consists essentially of:

(a) from about 100 parts by weight to about 150 parts by weight of a polyester resin component consisting essentially of:

(i) linear, saturated polyester exhibiting cohesive properties having a ball and ring softening point at from about 125° C. to about 180° C. and an elongation of up to about 20%; and (ii) linear, saturated polyester exhibiting adhesive properties having a ball and ring softening point at from about 70° C. to about 115° C. and an elongation of greater than about 800%; and (b) 100 parts weight of an epoxy resin component consisting essentially of:

(i) epoxy novolac; and (ii) cycloaliphatic epoxy:

(c) latent catalyst for the epoxy resin component; and (d) solvent for the polyester resin component and the epoxy resin component; and (3) drying the resin containing composite for a time and at a temperature that is effective to remove solvent but not cure the bonding resin; to provide a bond between the epoxy resin in the mica sheet and the polyester resin in the backing material at the mica-backing contact interface, providing a dried, flexible, porous, resin bonded, consolidated mica tape composite, characterized as capable of remaining a consolidated composite upon bending, without disintegration of the mica sheet.

5. The method of claim 4, wherein the polyester exhibiting cohesive properties has a tensile strength grater than about 6,000 psi., and the polyester exhibiting adhesive properties has a tensile strength of up to about 150 psi., where both polyesters are hydroxyl terminated and do not have any vinyl saturation in the polymer, the solids weight ratio of polyester exhibiting cohesive properties:polyester exhibiting adhesive properties is from about 1:2 to 5, the resin bonded tape contains from about 2 wt. % to about 15 wt. % resin solids and the dried mica tape is wound on a roll for storage.

6. The method of claim 4, where the solids weight ratio of epoxy resin component:polyester resin component:latent catalyst is from about 100:100 to 150:0.05 to 0.5, the the solids content of the resin admixture solution is from about 5 wt. % to about 55 wt. %, the epoxy equivalent weight of the epoxy novolac is from about 170 to about 220, the epoxy equivalent weight of the cycloaliphatic epoxy is from about 90 to about 160, the latent catalyst is an organo tin compound, and the resin containing composite is dried in an oven at from about 60° C. to about 100° C.

7. The method of claim 4, where the dried mica tape is wound around an electrical coil as a last step.

* * * * *